Patented Apr. 2, 1940

2,195,725

UNITED STATES PATENT OFFICE 2,195,725

METHOD OF MANUFACTURING SELENIUM RECTIFIERS

Georg Hoppe, Berlin, Germany, assignor to Patentverwertungs-Gesellschaft mit beschrankter Haftung "Hermes," Berlin, Germany, a corporation of Germany No Drawing. Application October 31, 1938, Serial No. 238,115. In Germany November 1, 1937

6 Claims. (Cl. 175—366)

This invention relates to a method of manufacturing selenium rectifiers and more particularly to an improvement of the rectifying action thereof.

It is known in the art to add sulphur to selenium which is to form a component of an electric rectifier of the dry type, for instance, by mixing it with molten selenium. In this manner a reduction of the resistance is attained and since this reduction is greater for the current flowing in the flow phase direction than for that flowing in the stop phase direction an improvement of the rectifying action is obtained by the admixture of sulphur.

In contradistinction to the manufacturing methods hitherto known the rectifying selenium layer is, according to the invention, exposed to sulphur fumes for a considerable time at a relatively high temperature, lying below the melting point of selenium, after the latter has been applied to a support, for instance, of iron and been transformed from the amorphous state to the conducting (crystalline) state. Surprisingly, in this case the opposite effect is attained from the known method of adding sulphur to selenium; that is to say, the resistance of the rectifier element is not decreased but increased. The current intensity during the flow phase is only reduced to about half its value, whereas the stop phase current intensity is reduced to one-twentieth and more, under certain circumstances even to one hundredth of its normal value. This constitutes a considerable improvement of the rectifying action, notwithstanding the reduction of the flow phase current, which cannot even be approximately attained with the method hitherto known.

The novel method may be carried out in the following manner.

The prepared blanks consisting of a support of iron provided with a selenium layer are stacked in a container and heated to the temperature at which the above-mentioned transformation of the state of selenium occurs; i. e., to about 200 degrees centigrade for about a day; whereupon the blanks are exposed to the fumes of sulphur at a temperature of 160 to 170 degrees centigrade by causing them to act on the selenium layer for about three quarters of an hour. In this manner very high values of the flow phase current are obtained, the valve effect being at the same time excellent. If it is deemed particularly important that the stop phase current should have very low values this may be obtained without impairing the flow phase current by exposing the metallic plates—provided with the selenium layer and cooled down to the room temperature after its transformation—in a cold state to the sulphur fumes for 1 to 1½ minutes. In the case of a rectifier blank having a diameter of 45 mm. a current of about 700 milliamperes was thus obtained in the flow phase direction measured at a voltage of 1 volt, the stop phase current amounting only to 5 to 10 milliamperes at a voltage of 12 volts.

The period during which the blanks are exposed to the sulphur fumes may be still reduced, for instance, to a few seconds by spraying the sulphur fumes by means of a compressed air jet on the selenium layer cooled down to the room temperature.

The individual rectifier elements when cooled down are completed by applying thereto a metallic counter-electrode, for instance, by spraying thereon a layer of lead or bismuth.

What is claimed is:

1. A method of manufacturing selenium rectifiers comprising the steps of heating the selenium to a temperature below its melting point at which it is transformed from the amorphous into the crystalline (conducting) state and then exposing the selenium to sulphur fumes.

2. A method of manufacturing selenium rectifiers comprising the steps of heating the seleium to a temperature below its melting point at which it is transformed from the amorphous into the crystalline (conducting) state and then exposing the heated selenium to sulphur fumes.

3. A method of manufacturing selenium rectifiers comprising the steps of heating the selenium to a temperature below its melting point at which it is transformed from the amorphous into the crystalline (conducting) state and then exposing the selenium at temperatures between 160° and 170° C. for about three-quarters of an hour to sulphur fumes.

4. A method of manufacturing selenium rectifiers comprising the steps of heating the selenium to a temperature below its melting point at which it is transformed from the amorphous into the crystalline (conducting) state and then cooling the transformed selenium to room temperature and exposing the selenium in cold state to sulphur fumes for one and one-half minutes.

5. A method of manufacturing selenium rectifiers comprising the steps of heating the selenium to a temperature below its melting point at which it is transformed from the amorphous into the crystalline (conducting) state and then cooling the transformed selenium to room temperature and spraying the cooled selenium with a jet of sulphur fumes.

6. A method of manufacturing selenium rectifiers comprising the steps of applying selenium in amorphous state to a metal plate constituting one rectifier terminal, heating the applied selenium to a temperature below its melting point at which it is transformed from the amorphous to the crystalline (conducting) state, cooling the selenium plate to room temperature, spraying the plate with a jet of sulphur fumes and applying a conducting layer to the sprayed selenium to form the other terminal of the rectifier.

GEORG HOPPE.